No. 713,074. Patented Nov. 11, 1902.
J. W. DENMEAD.
BOX MAKING MACHINE.
(Application filed Aug. 16, 1901.)
(No Model.) 7 Sheets—Sheet 1.
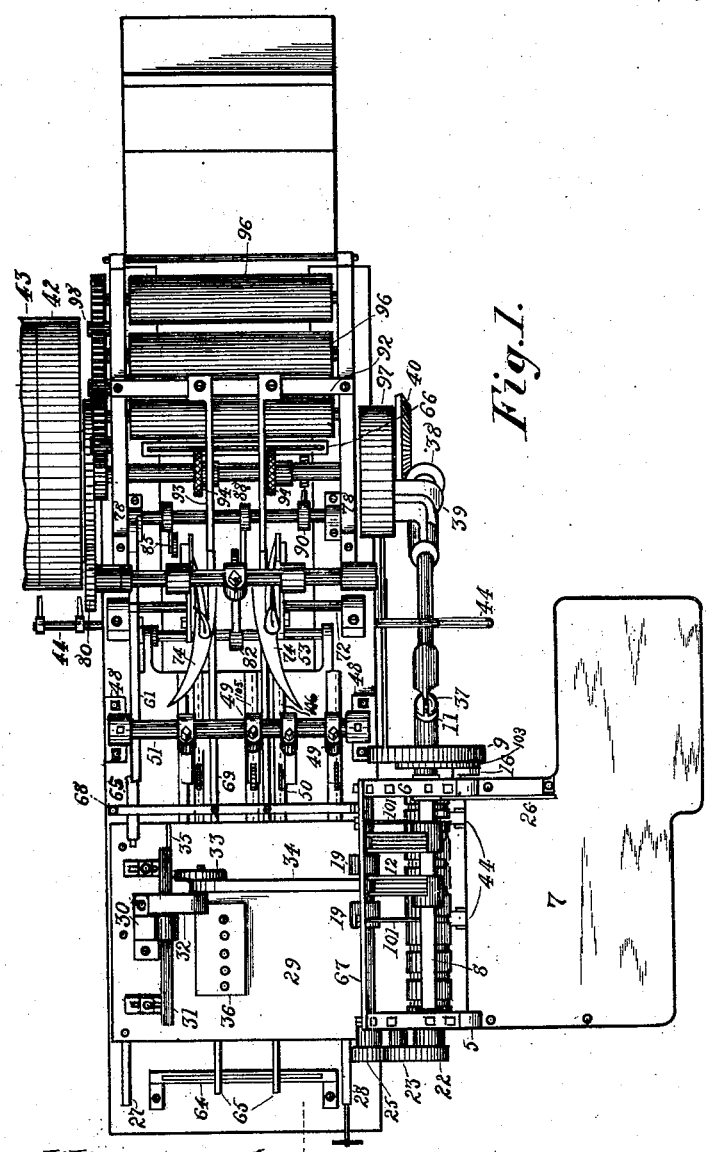
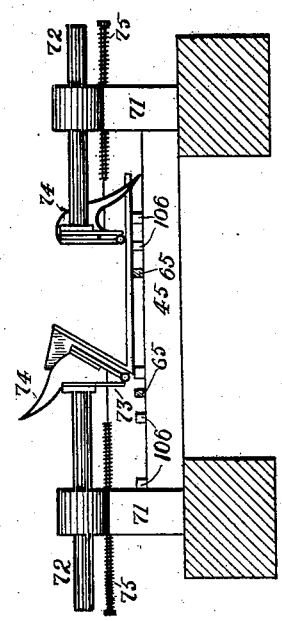
Witnesses:
Inventor:
John W. Denmead,
By Humphrey & Humphrey,
his Attorneys.

No. 713,074. Patented Nov. 11, 1902.
J. W. DENMEAD.
BOX MAKING MACHINE.
(Application filed Aug. 16, 1901.)

(No Model.) 7 Sheets—Sheet 6.

Witnesses: Inventor:
Maude Grisler John W. Denmead,
Bessie Booth By Humphry & Humphry,
his Attorneys.

No. 713,074. Patented Nov. 11, 1902.
J. W. DENMEAD.
BOX MAKING MACHINE.
(Application filed Aug. 16, 1901.)
(No Model.) 7 Sheets—Sheet 7.
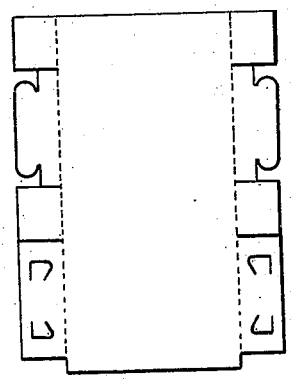
Fig.11.
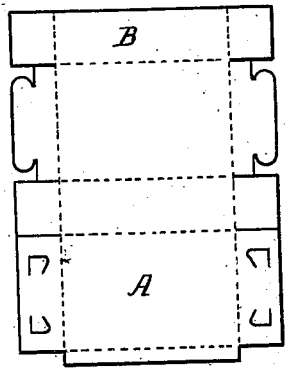
Fig.12.
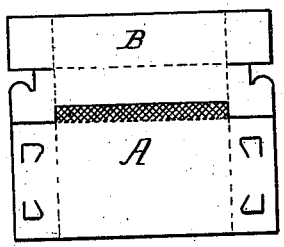
Fig.13.
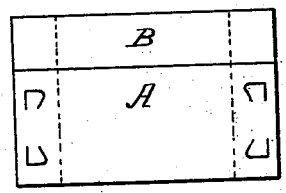
Fig.14.
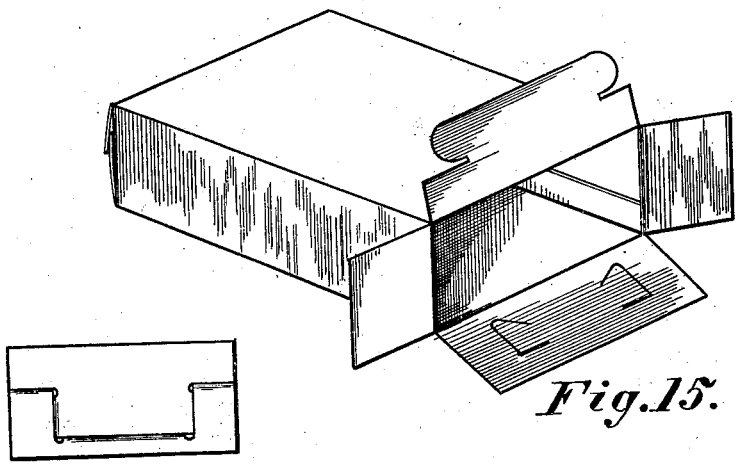
Fig.15.
Fig.16.
Witnesses:
Inventor:
John W. Denmead,
By Humphrey & Humphrey.
his Attorneys.

UNITED STATES PATENT OFFICE.

JOHN W. DENMEAD, OF AKRON, OHIO.

BOX-MAKING MACHINE.

SPECIFICATION forming part of Letters Patent No. 713,074, dated November 11, 1902.

Application filed August 16, 1901. Serial No. 72,305. (No model.)

*To all whom it may concern:*

Be it known that I, JOHN W. DENMEAD, a citizen of the United States, residing at Akron, in the county of Summit and State of Ohio, have invented a certain new and useful Improvement in Box-Making Machines, of which the following is a specification.

My invention has relation to improvements in machines for making paper boxes, and has especial relation to the production of a machine for scoring, folding, pasting, and rolling a previously-cut blank in such a manner that the resulting product will be a flattened collapsed box capable of afterward being opened and with its ends in condition for ready folding.

The object of my invention is to produce a machine which shall be able to produce a box embodying the before-mentioned features and one in which all operations are performed entirely automatically.

To the aforesaid object my invention consists in the peculiar and novel construction, arrangement, and combination of the various parts hereinafter described and then specifically claimed, reference being had to the accompanying drawings, forming a part of this specification.

Figure 2:
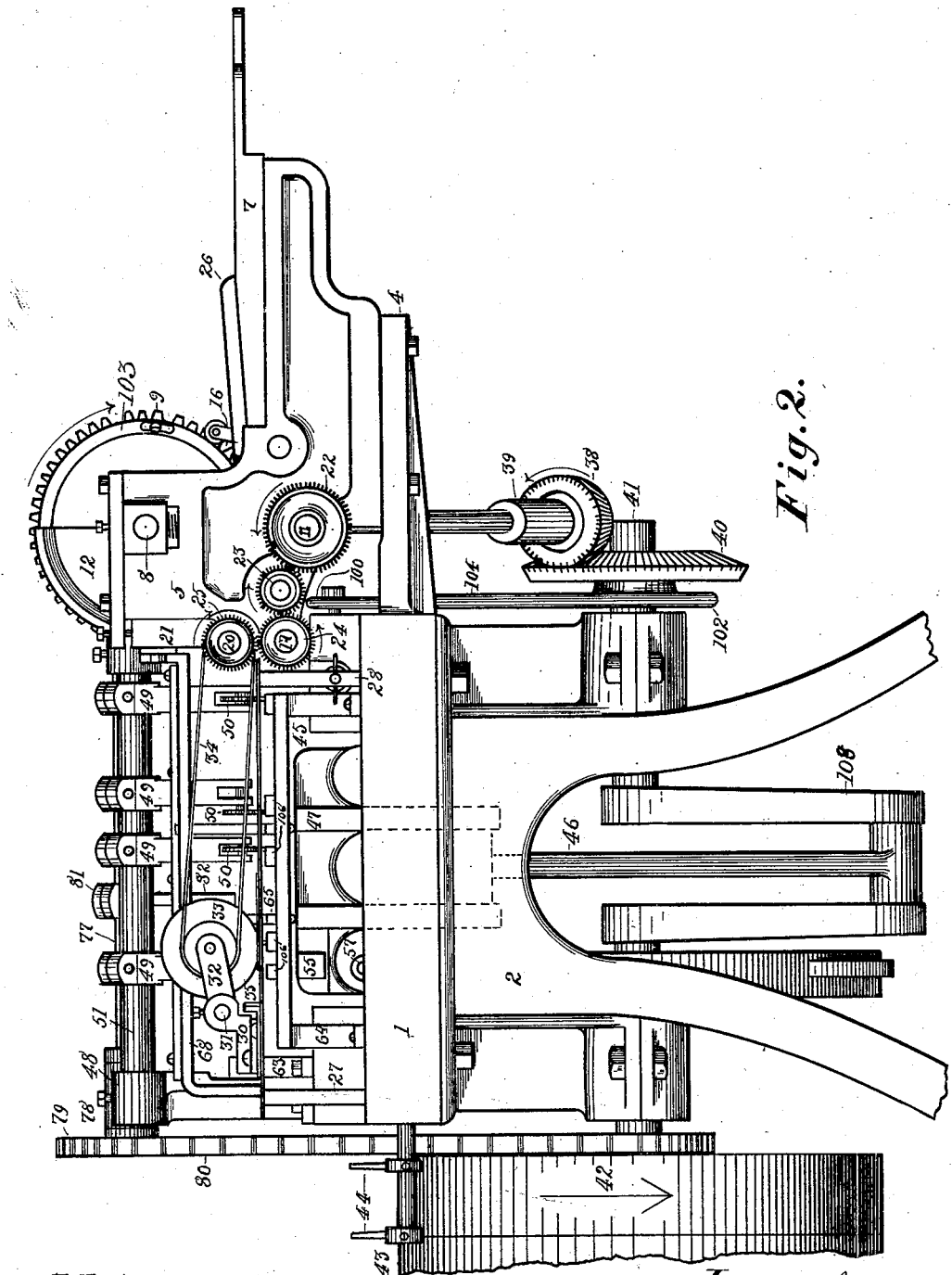
Figure 3:
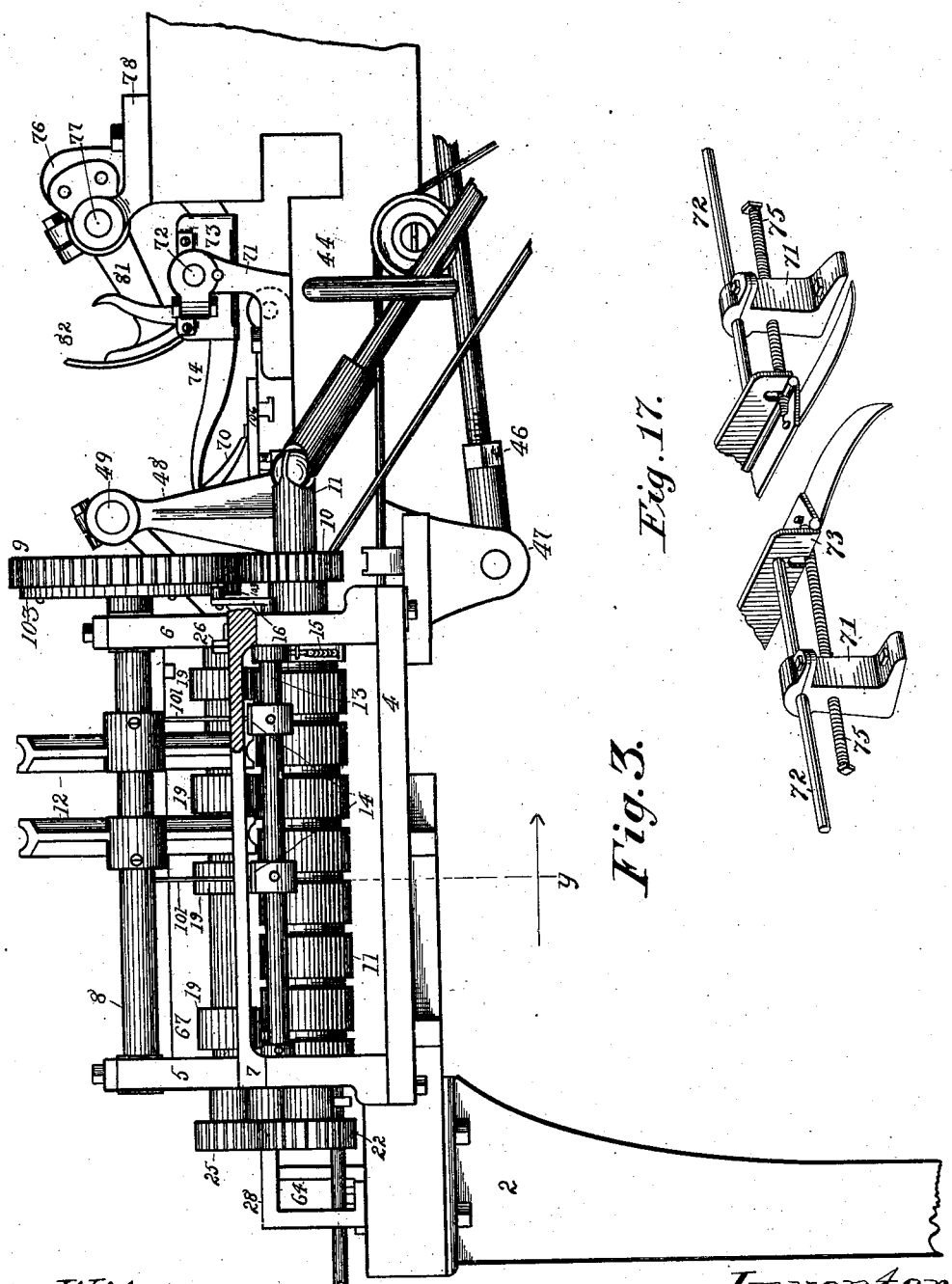
Figure 4:
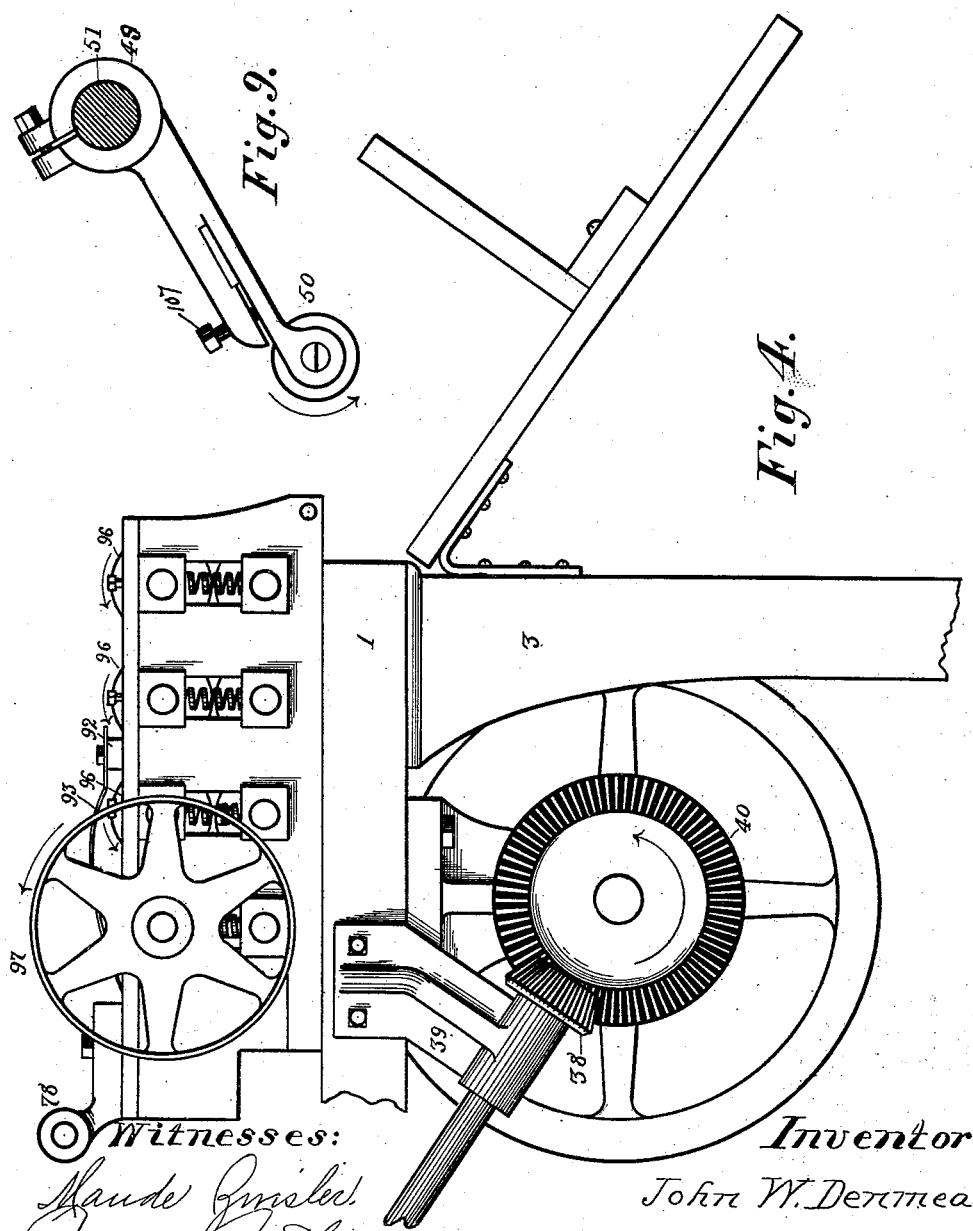
Figure 5:
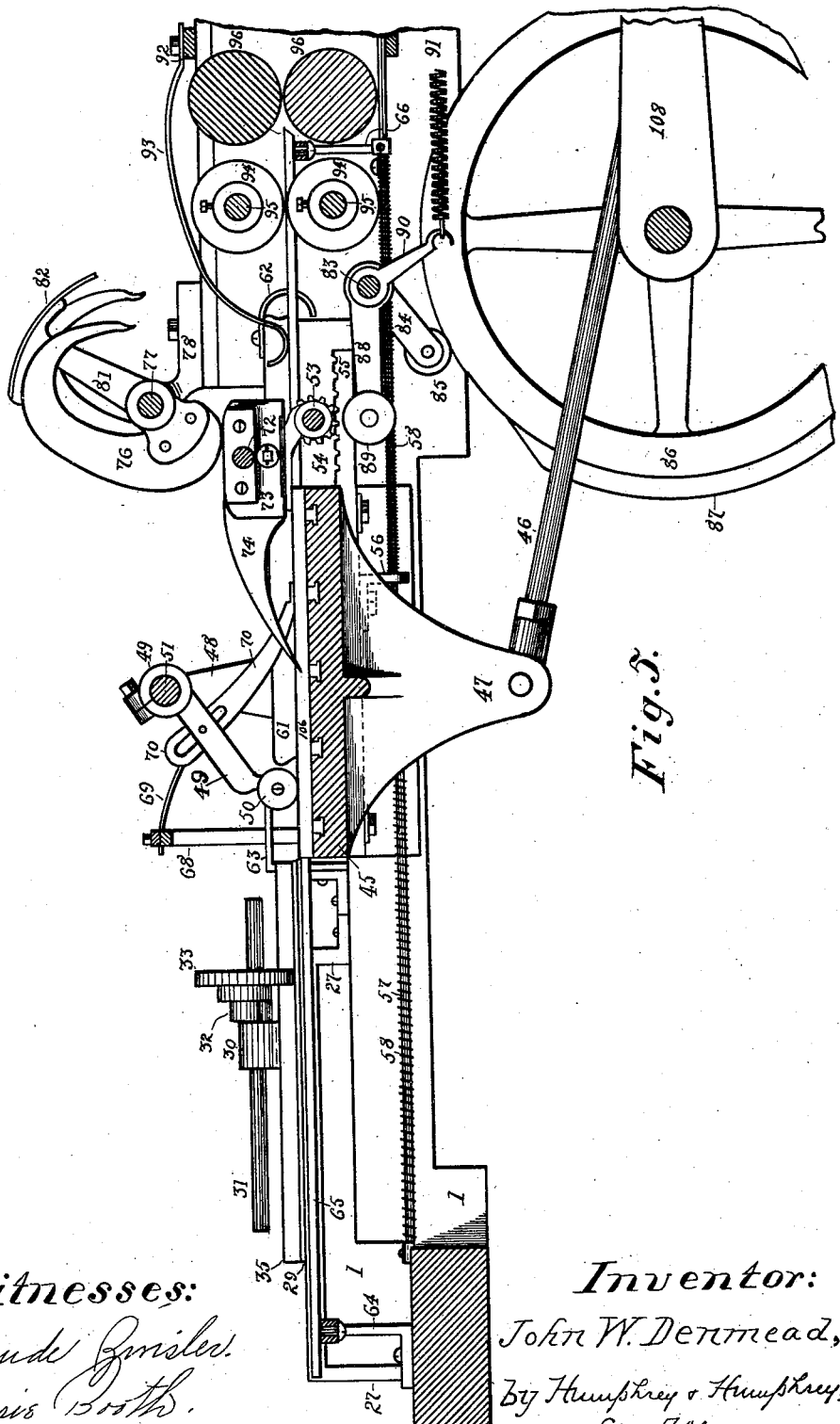
Figure 6:
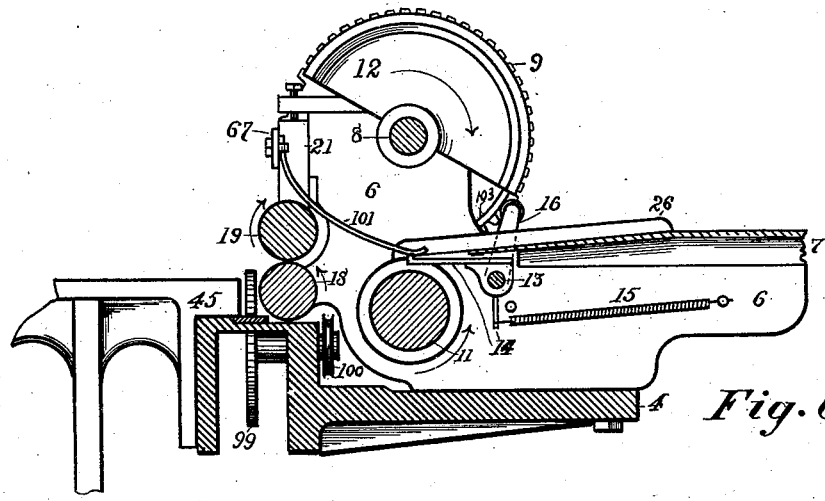
Figure 7:
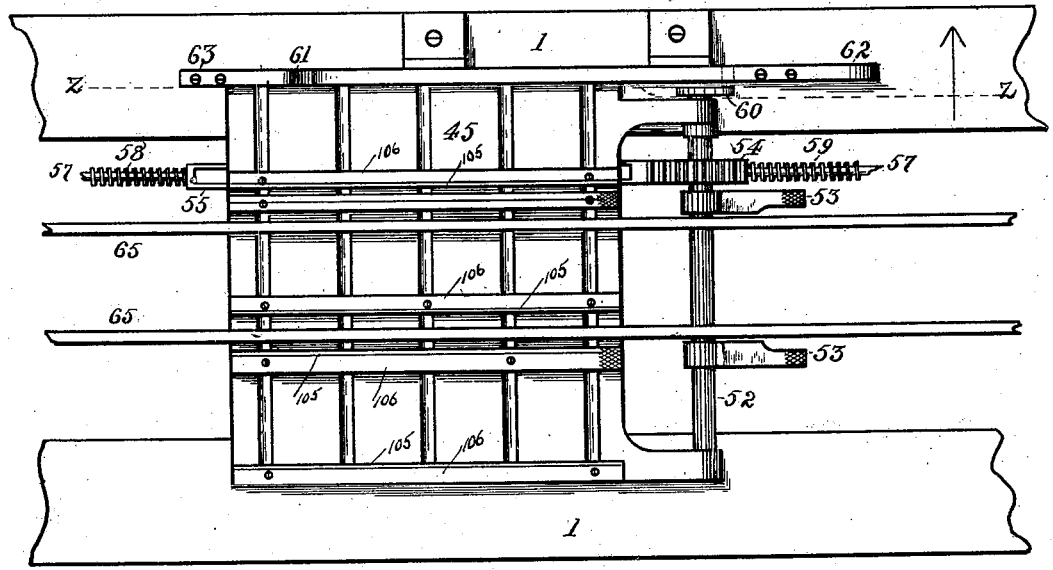
Figure 8:
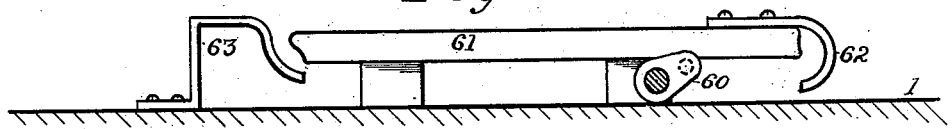

In the accompanying drawings, in which similar reference characters indicate like parts in the different figures, Figure 1 is a plan of my improved machine; Fig. 2, an end elevation looking from the left of Fig. 1; Fig. 3, a side elevation of part of Fig. 1; Fig. 4, a side elevation of the balance of the machine not shown in Fig. 3 on account of lack of space; Fig. 5, a section at the line $x$ of Fig. 1; Fig. 6, a section at the line $y$ of Fig. 3; Fig. 7, an enlarged detail of the main cross-head; Fig. 8, a section at the line $z\ z$ of Fig. 7; Fig. 9, a detail of the scoring-roller arm; Fig. 10, a detail of the folding mechanism; Figs. 11, 12, and 13 and 14, details of the paper blank with the various scoring-marks, method of folding, &c.; Figs. 15 and 16, views of the complete box. Fig. 17 is a perspective view of a portion of my machine.

In the drawings, 1 is an elongated frame open in the center and supported upon pairs of legs 2 and 3. Projecting from the right-hand side of the frame 1, Figs. 2 and 6, is a horizontal integral shelf 4, upon which are bolted two upright housings 5 and 6, having projecting integral parallel arms which support a shelf or table 7, having a downward-inclined part situated between the housings 5 and 6.

Mounted in vertically-adjustable boxes in the housings 5 and 6 is a shaft 8, provided at its outer end with a spur-gear 9, which meshes in a pinion 10 on a parallel shaft 11, mounted in the housings 5 and 6. On the shaft 8 are two semidisks 12, mounted on hubs and fastened tight on the shaft. The shaft 11 is enlarged between the housings 5 and 6 into a roller having at intervals deep notches cut therein. The semidisks 12 and the main surface of the roller are arranged to pass in very close proximity to each other. Mounted in the housings 5 and 6 and in front of the shaft 11 is a shaft 13, bearing a number of collars, two of which bear projecting extended tangential arms 14, having sharply-upturned ends which rest in the grooves in the roller on the shaft 11. These hooked ends normally are held down in the grooves in the roller by a spring 15, attached to a pin on a collar on shaft 13. In order to raise the hooked ends above the periphery of the roller on shaft 11, an arm 16, provided with a friction-roller, is placed on the end of shaft 13 and arranged to encounter a concentric strip 103 on the inner side of the gear 9. This strip 103 extends only substantially half around the gear 9 and is so placed as to rock the arm 16 on shaft 13 and cause the hooked ends 14 to rock upward and project above the periphery of the roll on shaft 11. Also mounted in the housings 5 and 6 is a shaft 17, bearing a desired number of scoring-rollers 18, which run in close proximity with similar rolls 19 on a shaft 20, which are mounted on vertically-movable slides 21.

The slight space between the scoring-rolls 19 and 18 is in the same horizontal plane as the similar space between the semidisks 12 and the roller on the shaft 11, so that an article, as a sheet of cardboard, passing between the latter two will also be engaged by the scoring-rolls 19 and 18. The shaft 11 is provided on its left end, Fig. 3, with a spur-gear 22, which meshes into an idler 23, meshing into a gear 24 on the shaft 17, bearing the lower scoring-rolls. This last gear 24 meshes with the gear 25 on the upper scoring-roll shaft 20, and the direction of revolution of the shaft is indicated by arrows in Fig. 2. Upon the feeding-table 7 is a guide 26, the object of which is to direct the supply of blanks to the first set of rolls.

Across and between the housings 5 and 6 (see Figs. 1, 2, 3, and 4) is a bar 67, to which are secured, by means of thumb-nuts or otherwise, two downwardly-pressing springs 101, bearing upon the upturned face of the hooked ends 14. The ends of these downwardly-pressing springs are rounded and are used to direct with more certainty the travel of the advancing blank from the top of the roller on shaft 11 to the union or space between the first pair of scoring-rolls 18 and 19 and prevent the tilting or any upward motion of the blank while awaiting to be acted upon by the semidisks 12.

Attached to the frame are two upright brackets 27 and 28, supporting a table-top 29. These brackets 27 and 28 are mounted on the main frame 1 and consist of a single bar bent upward to support the table-top 29 and then downward and having both ends bolted to the frame. This table-top 29 consists of a thin sheet of metal extending from near the junction or near the central line between shafts 20 and 17 and has mounted on its upper surface a bracket 30, which sustains a horizontal shaft 31, mounted upon which is an arm 32, bearing a shaft on which is mounted a wheel 33, having on its outer periphery a coating or band of rubber and adapted to nearly touch the table-surface 29. Between the wheel 33 and the arm 32 is a pulley, on which runs a belt 34, which also passes over a pulley mounted on shaft 20 and through which motion is communicated to the wheel 33.

The operation of the device thus far described is as follows: Blanks cut in the shape indicated in Fig. 11 are passed over the table-top 7, substantially between the roller on shaft 11, and are engaged by semidisks 12. They are by the motion of these two passed forward between the scoring-rolls 18 and 19, which indents upon their surface the lines indicated by dotted lines in Fig. 11, and through the scoring-rolls they pass out upon the table-top 29 until they reach an abutment-plate 35, placed on the table adjustably and shown in Figs. 1 and 2. In order to secure the perfect and even meeting of the head of the incoming blank against this plate and to provide for its meeting it squarely, the roller 33, covered on its outer edge by rubber, is constantly revolved in the same direction as the shaft 17, the constant aim of which is to force the blank against the abutment-plate firmly and squarely. In placing these blanks for their scoring, before described, they are slid by hand over the roller on shaft 11 until they encounter the two hooked ends 14, which trues them evenly with the side guide 26, and are held against further forward motion by the roller-arm 16 being in contact with the concentric strip on gear 9; but as one end of the semidisks 12 approach the roller on shaft 11 the roller on arm 16 runs over the end of the strip 103, and the springs 15 draw down the hooked ends 14, permitting the semidisks 12 to squeeze the blank between them and the roller ends of the shafts 18 and 19, by which it receives the creases before noted and from which it emerges out upon the table 29 until it encounters the rubber-covered wheel 33, which brings it squarely against the abutment-plate 35 ready for the next operation. Upon the table 29 is a slightly-raised plate 36 adjacent to the rubber-covered wheel 33, and this plate consists of a thin adjustable sheet of metal, smoothed on four sides, over which the incoming blank passes, and its object is to slightly raise the blank from the table-top 29 in order to more fully insure frictional engagement with the wheel 33. The shaft 11 contains outside of the pinion 10 a universal joint 37 and receives power by being provided at its free end with a beveled pinion 38 and is supported by a bracket 39, bolted to the main frame of the machine. This pinion 38 is rotated by meshing with a beveled gear 40, mounted on a main shaft 41, supported in suitable brackets on the under side of the main frame of the machine. This shaft 41 is driven by a pulley 42 from any convenient source of power. The shaft 41 also bears a loose pulley 43, upon which the belt may be shifted at times when it is not desired to operate the machine. A belt-shift 44, properly journaled and secured in the machine, is used to move this belt from the tight pulley to the loose and back again. The rotation of the main shaft 41 in turning rotates the beveled gear 40, the pinion 38, and the shaft 11 and through the beveled pinion 10, the main gear 9, and the semidisks 12. The rotation of the shaft 11 through the gear 22 operates the idler 23, the gears 24 and 25, which operate the scoring-rolls 18 and 19. The rotation of the shafts 17 and 20 operate the belt 34 and the rubber-covered wheel 33.

The method of producing the pair of vertical score-marks on the blank (indicated by dotted lines in Fig. 11) having been described, the process of making the cross-scoring shown by dotted lines in Fig. 12 follows. Mounted to slide on the parallel sides of the frame 1 is a cross-head 45, the motion of which is reciprocating along the frame, the motive power for which is furnished by means of a connecting-rod 46, uniting a pair of depending arms 47, bearing a shaft-journal for the connecting-rod 46, with a pair of revolving cranks 108 on the main driving-shaft 41. This cross-head has depending flanges to furnish guides to bear against the sides of the frame 1 and steady the movements of the cross-head 45. Upon the upper face of the cross-head are a number of strips 106, running longitudinally thereof and transversely adjustable with relation to one another by means of screws passing through them and engaging nuts in shallow transverse grooves of the cross-head. (See Figs. 5 and 7.) The upper faces of certain of the strips 106 have slightly-raised ridges 105. (Indicated by lines in Fig. 7.) Mounted on the sides of the frame 1 are upright brackets 48, the office of which is to hold an irrevoluble cross-shaft 51, from which depend a desired number, as four, of arms, in the lower ends of which are pivoted score-wheels 50. These wheels 50 are grooved to receive the raised ridges 105 on the longitudinal strips 106 on the cross-head. These arms 49 (shown enlarged in Fig. 9) consist of split heads clamped by bolts about the shaft 51 and split at their free ends and to the lower lesser halves of which are journaled the scoring-rolls 50, whose vertical positions are adjusted by setscrews 107, meshing in the upper firmer halves of the arms 49.

The scoring-wheels 50 are intended to produce the transverse scores upon the blank (indicated in Fig. 12) by transverse dotted lines, and it is evident from the preceding that if means are provided for the blank to be fed forward upon the table 29 and to travel with the cross-head 45 the blank going at this time in a sidewise direction will be scored upon the lines indicated in Fig. 12 by dotted lines by means of the before-mentioned scoring-rolls 50 and the raised strips 106 upon the cross-head 45.

In order to provide means to cause the blank after leaving the first pair of scoring-rolls to move with the cross-head, I have provided the following-described nippers to seize the blank and hold it firmly upon the raised ridges of the cross-head and cause it to travel therewith to a determinate distance.

In the front portion of the cross-head are two projecting arms bearing journal-bearings in which is mounted a shaft 52, capable of rotation. Upon this shaft is mounted a pair of arms 53, having at their outer tapered ends a corrugated surface and adapted when swung in one direction to press tightly upon the adjacent corrugated ends of two of the longitudinal ridges on the cross-head. Upon this shaft 52 is also mounted a small spur-gear 54, arranged to mesh in rack-cut teeth on the upper surface of a bar 55, slidably attached to the under side of the cross-head by means of bolts. Depending from this bar 55 is a stud 56, arranged to inclose a longitudinal rod 57, extending substantially the entire distance of the frame and fastened thereto. Upon this rod 57 are two coiled springs 58 and 59, so adjusted that when extended and the stud 56 is central between the two neither will quite reach the center of the travel of the cross-head. On one end of the shaft 52 is a crank-arm 60, bearing a pin at its outer free end. This pin is arranged to engage when rocked in either direction the under surface of a longitudinal bar 61. This bar is provided at one end with a curved strap 62 and at the other end nearly meets an upright downwardly-turned strap or bracket 63. The bar 61 is separated from and mounted on one side of the main frame 1 and in such a position that when the pin on the crank-arm 60 is rocked upward will engage it and prevent its upward movement. The operation of this last-named device is as follows: The blank after passing through the first pair of scoring-rollers and being pressed firmly and squarely against the abutment-plate 35 by the roller 33 slightly overhangs the edge of the plate 29 on one side. The cross-head bearing longitudinal strips 106 is arranged to pass immediately under the plate 29, and the nippers 53 are then swung around by the mechanism before described and grasp the paper between their corrugated ends and the corrugated ends of the strips on the cross-head and draw the blank sidewise along with the cross-head in its return stroke until by the before-mentioned mechanism the nippers are swung in an opposite direction and release the blank. The manner in which the nippers are caused to swing in one direction and then in another is as follows: The slotted bar 55 is permitted a slight longitudinal motion by reason of the slot in it, and any motion communicated to this rack by means of the bar will cause a partial rotation of the small gear 54 and the shaft 52 in the cross-head, together with the nippers 53 mounted thereon. Now if the cross-head moves in the direction of the main driving-shaft 41 the depending stud 56 will encounter the coiled spring 58, which will press the stud 56, together with the slotted bar 55, in an opposite direction and tend to rotate the nippers in a direction to prevent their pressing upon the corrugated portions of the strips 106 on the cross-head, and consequently they would not press thereon and seize the paper or blank as desired were it not for the fact that the pin on the crank end of the shaft 52 is prevented from swinging around by reason of the bar 61. As the cross-head nears the end of its stroke the pin will pass from under the bar 61 into the space (see Fig. 5) between the bar 61 and the strap 62, which will permit it to rise and swing upward, and as the cross-head returns on its stroke the pin will pass down under the bar 61 in an opposite direction and slide on the under side of the bar 61 until at the completion of the stroke of the cross-head the pin on the crank 60 will pass from under the bar 61 and make a partial rotation and be again drawn downward, following the center of the shaft 52 and force the nippers down upon the corrugated portions of the longitudinal strips 106 of the cross-head, so it will be seen that as the cross-head moves in the direction of the main driving-shaft 41 the nippers 53 will be held down upon any object—as, for instance, the blank in this case—and retain it until the pin has passed from under the bar 61, which will permit the partial rotation of the pin, and with it the nippers, thereby releasing them from contact or engagement with the blank, and in each motion of the cross-head in the opposite direction the nippers will stand in the position indicated in Fig. 7.

In order to assist the blank in its transit with the cross-head, it is found that additional means of support therefor are needed. To accomplish this, there is placed at the extreme end (left in Fig. 1) an upright horizontal bracket 64, upon which is adjustably mounted two longitudinal square bars 65, which pass under the table 29 and over the face of the cross-head between its longitudinal strips 106 and are supported at their other ends by a like bracket 66 at nearly the opposite end of the machine. These bars afford an additional support for the blank in its travel after leaving the table-top 29 and support it after passing through the operations performed on the cross-head. In order to press this blank down firmly between the longitudinal strips 106 on the cross-head and upon the two bars 65, I place across the space between the side bars of the main frame 1 a bridge 68, consisting of two strips, one above the other, bolted together and clamping between them downwardly-pressing springs 69, whose object and purpose are to press firmly down on a blank passing through the machine and carried on the cross-head to assist in retaining the blank thereon. The position of these springs 69 is immediately above the square rods 65 and on which they normally press in the absence of blanks in the machine. Immediately above the strips on the cross-head and whose constant tendency is to force downward the traveling blank upon the cross-head I also fasten adjustably, by means of a bolt or screw, two folding-blades 70 to the arms 49, bearing the scoring-rolls 50. (See Fig. 5.) These two folding-blades 70 are so situated longitudinally that they press upon the scores made by two of the scoring-rolls 50, and their purpose is to form the inside folding-blades over which the ends of the blank are bent in making the boxes. As their position is substantially on the scores, very slight effort is necessary to raise the ends of the blank to fold them over. During the transit of the blank on the upper surface of the strips 106 on the cross-head 45 paste is applied to the blank in the following manner and is placed upon that portion of the blanks designated by the letter A in Figs. 12, 13, and 14 on its under surface.

The paste is indicated in Fig. 13 by a corrugated surface, and this end is the last portion of the blank to pass between the preliminary scoring-rolls, and therefore lies upon the right side of the table-top 29 in Fig. 2 and the lower part of the table-top in Fig. 1. In Fig. 6 is shown glue-wheel 99, mounted in the frame 1 and revolving in a hollow space in said frame and operated by means of a sheave on its shaft actuated by a belt 104, running over a sheave 102 upon the main driving-shaft 41 of the machine. This glue-wheel is arranged to place glue on the right-hand end of the blank during its sidewise transit on the cross-head.

The mechanism for folding over the ends of the now scored and pasted blank is as follows: Mounted on both sides of the main frame are two upright brackets 71, from each of which extend like shafts 72, whose axes are in alinement, bearing at their inner end and firmly secured thereto plates 73. At the lower sides of these plates are hinged folders 74. These folders are provided on the sides which are adjacent to the plates 73 with hardened-steel surfaces or plates (not shown) for the mechanism, to be hereinafter described, to bear. The general outline of these folders 74 is that nearest described by saying that they resemble a flattened cow's horn, whose points when rocked down will be below the level and between the longitudinal strips 106 on the cross-head, and so placed as to encounter the front edge of the advancing blank outside of the folder-blades 70. These folders 74 are normally held upward (see Fig. 10) by a coiled spring 75, surrounding a rod, and which spring passes through the plates 73 and engages the comparatively flat surface of the folders 74. It will be borne in mind that normally the position of these folders is that shown by the right-hand folder in Fig. 10, and they stand nearly against the plates 73 and are held there by the springs 75. The mechanism which causes them to swing on their hinges and throw their outer or free ends upward consists of two curved plates 76, mounted on a transverse shaft 77, rotating in brackets 78 on the sides of the main frame of the machine. These curved plates consist of sheets of hardened steel in the shape of involute curves whose vertical inclination is toward the center of the machine from their larger portions to their tips and which as they are swung around enter the space between the plates 73 and the flattened or straight portions of the folder 74, and as they continue their revolution they force the folders downward to substantially a right angle with the plates 73 and cause the horns or tapered points of the folders to rise. As the blank in its movement along the top of the machine encounters the folding-blades 74 74 while in the upright position, as shown at the right-hand side of Fig. 10, the blank being held at the crease by the inside folder-blades, these horns 74 as the blank moves along fold up the sides of the blank on the line of the crease or score. The folding-blades are then moved by the parts 76, just described, downward into the horizontal position and fold over the blank upon itself. The rotation of the shaft 77 is caused and induced by a sprocket-wheel 79, which is rotated by a sprocket-chain 80 running over a sprocket-wheel on the main driving-shaft 41 and closely adjacent to the driving-pulley 42 and geared to such a speed as to cause the rotation of the shaft 79 and the plate 76 to operate the folders accurately and absolutely to meet each advancing blank as it travels with the cross-head. The folders 74 are arranged to raise their outer pointed ends one slightly in advance of the other, so that the portion of the blank marked A may be folded down first, and the portion marked B will fold over and slightly overlap the portion A, the portion A, which is intended to be overlapped by the portion B of the blank, having been coated before this by a suitable quantity of paste to cause adhesion. The folders 72 are caused to operate one after the other and not simultaneously by reason of the fact that the curved plates 76 are set on the shaft 77 one slightly in advance of the other, so that one of the curved plates 76 commences its engagement with its folders 74 slightly in advance of the other. At the time that the folders 74 conclude their operation the nippers 53 will have been released from contact and engagement with the blank, and in order to continue the now folded blank forward I place on the shaft 77 an arm 81, bearing on its outer edges a concentric foot 82, containing an arc of a circle which said arm 81 would described. This foot makes a revolution with each revolution of the shaft 77 and is adapted to bear upon the upper surface of the blank between the supporting-rods 65 and, in combination with mechanism to be described, to push forward the now already pasted blank into the compressing-rollers following. Below the shaft 77 and parallel therewith and journaled in the main frame of the machine is a shaft 83, bearing a slightly-depending arm 84, on which is mounted a frictional roller 85, adapted to run on a large wheel or pulley 86, mounted on the main driving-shaft 41 of the machine. Upon this pulley or wheel 86 is a cam-ridge 87, so placed that during a portion of the revolution of the wheel 86 the cam 87 will encounter the roller 85 and through the arm 86 cause a partial rotation of the shaft 83. This cam-ridge 87 extends only a portion of the circumference of the wheel 86. Also mounted on the shaft 83 is an arm 88, bearing a roller 89, whose position is such that when the cam-ridge 87 on the wheel 86 raises the arm 84 the roller 89, before mentioned, will press against the concentric foot 82 on the arm 81 closely and will serve as a support for the under side of the advancing blank during the pushing of the same, due to the rotation of the foot.

The roller 85 is held in constant engagement with the wheel 86 and cam-ridge 87 by means of a depending arm 90, constantly held in one direction by a coiled spring 91, fastened to any desired or preferred place on the main frame. At this point it is desirable to retain the advancing and now pasted and folded blank firmly upon the supporting-bars 65, and to insure this I place a cross-bar 92 upon the upper portions of the main frame 1 and to which I bolt or fasten by any suitable means two downwardly-acting flat springs 93, whose tendency is to bear down upon the upper surfaces of the supporting-bars 65, and these springs have upturned ends and are arranged to ride over and press down upon the advancing blank. Beyond the shaft 83, just previously described, and immediately above one another are two pairs of corrugated rollers 94, mounted on shafts 95, journaled transversely in the main frame of the machine and as shown in Fig. 1. These rollers are adapted to run immediately outside of the supporting-bars 65 and are intended to seize upon and feed forward the blank. Adjacent to these last-named rollers are three pairs of compressing-rollers 96, arranged in pairs immediately above one another, whose office is to roll the advancing and pasted blank firmly to insure absolute cohesion between the parts. The rolls 96 and the rolls 94 are arranged and adapted to run with a uniform speed and each pair in a like direction. This is accomplished by placing on the upper and nearer end in Fig. 1 of the shaft 95 a belt-pulley 97, which is driven by any convenient source of power and in the same direction as that of pulley 42. The shafts 95 and the shafts of the compressing-rolls 96 all bear gears on one end and by means of idlers 98 are caused to rotate in a uniform direction, the top row of gears meshing into the gears on the lower rolls primarily and the idlers are placed between the lower sets of gears.

At the extreme right end of the machine in Fig. 1 I place a hopper or shelf (better illustrated, perhaps, in Fig. 4) upon which the finished products may fall.

It is believed that the operation of the machine is sufficiently clear from the description accompanying the operation of the parts of the machine.

When the box leaves the machine, it is in the shape shown in Fig. 14 and is readily opened by hand and the ends closed, presenting when in this condition the appearance shown in Figs. 15 and 16, which represent the box with one end opened and one closed.

What I claim, and desire to secure by Letters Patent, is—

1. The combination in a machine for making paper boxes from paper blanks consisting of a roller running in close proximity to a pair of semidisks, and a pair of semidisks rotating in juxtaposition to said roller, means mounted in said machine for holding said blanks steady previous to starting said blank into said mechanism, scoring-rolls to receive the blank and impress scorings thereon, a table to receive the blanks from said scoring-rolls, a wheel rotating above said table to move said blank forward on said table, and an abutment-plate to arrest the further progress of said blank on said table and means to adjust said abutment-plate, substantially as shown and described.

2. The combination in a machine for manufacturing paper boxes from blanks, of a roller, means mounted on said roller to steady said blank, a pair of semidisks adapted to rotate in close proximity to said roller, means for operating the means for truing said blank on said roller, a pair of scoring-rollers one of which is capable of vertical adjustment to impress scorings upon said blank, a pulley mounted on the shaft of one of said scoring-rolls, a table to receive the blanks from said scoring-rollers, a rubber-covered wheel mounted on said plate to move forward said blank, a belt to cause said rubber-covered wheel to rotate with said pulley on said scoring-roller shaft and an abutment-plate mounted on said table to arrest the progress of said blank at a desired point, substantially as shown and described.

3. The combination in a machine for manufacturing paper boxes from blanks, of a grooved roller, a pair of semidisks arranged to rotate in close proximity to said roller to feed forward said blanks, a pair of scoring-rollers to score said blanks in one direction, a rock-shaft journaled in the housings of said roller-shaft bearing a pair of depressible hooks with their ends in the grooves in said first-named roller, a transverse bar mounted on said housings, a pair of downwardly-turned rods to press upon the upper surfaces of said depressible hooks and the blanks when passing over said grooved roller, substantially as shown and described.

4. The combination in a machine for manufacturing paper boxes from blanks, of a roller adapted to run in close proximity to a pair of semidisks to feed forward the blanks, and a pair of semidisks in juxtaposition to said roller, a pair of scoring-rollers adapted to receive and impress scorings upon said blanks, a table to receive said blanks from said scoring-rolls, and an adjustable flat plate on said table to slightly tilt desired portions of said blanks while on said table, substantially as shown and described.

5. The combination in a machine for manufacturing paper boxes from blanks consisting of preliminary scoring-rolls, a table to receive said blanks therefrom, a cross-head mounted in said frame adapted to reciprocate therein, a plurality of scoring-rolls mounted in said frame and adapted to score said blanks in a direction transverse to said preliminary scorings, a bridge on said frame above said cross-head and pressing-springs mounted on said bridge arranged to bear upon the upper surfaces of said blanks during said second scoring, substantially as shown and described.

6. The combination in a machine for manufacturing paper boxes from blanks, of a pair of preliminary scoring-rolls, a table to receive the blanks therefrom, a reciprocating cross-head mounted in said frame, nippers mounted on said cross-head to grasp said blank while on said table and convey it forward with said cross-head, a pair of longitudinal rods passing under said table and over said cross-head to form a support for said blank after leaving said table, substantially as shown and described.

7. The combination in a machine for manufacturing paper boxes from blanks, of a pair of preliminary scoring-rolls, a table to receive the blanks therefrom, a reciprocating cross-head mounted in said frame, nippers mounted on said cross-head to grasp said blank while on said table and convey it forward with said cross-head, a pair of longitudinal rods passing under said table and over said cross-head to form a support for said blank after leaving said table, a bridge mounted on said frame over said cross-head bearing a pair of downwardly-pressing springs immediately above said longitudinal rods upon the upper surfaces of the blanks during their movement with the cross-head, substantially as shown and described.

8. The combination in a machine for manufacturing paper boxes from blanks, of means to score said blanks in one direction, a table to receive them after said scoring, a cross-head mounted and adapted to reciprocate along said frame, longitudinal strips mounted on the upper surface of said cross-head and provided with slight ridges thereon, a plurality of scoring-rolls mounted above the path of said cross-head adapted to stand immediately above the strips on said cross-head and score said blanks transverse to said first scoring, substantially as shown and described.

9. The combination in a machine for manufacturing paper boxes from blanks, consisting of a pair of preliminary scoring-rolls to score said blanks in one direction, a table to receive them therefrom, a reciprocating cross-head mounted in said frame, a pair of nippers mounted on said cross-head adapted to engage and carry forward the blank in a direction transverse to the first scoring-rolls, scoring-rolls mounted above said cross-head adapted to score said blank in a line with the travel of said cross-head, a pair of folders mounted on the supporting-arms of said second scoring-rolls adapted to press down upon said blank in its travel with the cross-head and to impress upon said blank the line of fold thereon, substantially as shown and described.

10. The combination in a machine for manufacturing paper boxes from blanks, of a reciprocating cross-head, means mounted on said cross-head for supporting said blanks, a pair of nippers mounted on a revoluble shaft in said cross-head arranged to grasp the paper when turned in one direction, a sliding bar mounted under and on said cross-head provided with rack-teeth, a pinion mounted on said shaft in said cross-head meshing into said rack-teeth, and springs to cause longitudinal motion of said bar and rack-teeth and rotate said shaft and nippers, substantially as shown and described.

11. The combination in a machine for manufacturing paper boxes from blanks, of a reciprocating cross-head, means mounted on said cross-head for supporting said blanks, a pair of nippers mounted on a revoluble shaft in said cross-head arranged to grasp the paper when turned in one direction, a sliding bar mounted under and on said cross-head provided with rack-teeth, a pinion mounted on said shaft in said cross-head meshing into said rack-teeth, and springs to cause longitudinal motion to said bar and rack-teeth and rotate said shaft and nippers, a crank-arm mounted on the end of said cross-head shaft bearing a projecting pin, a bar mounted on said frame to one side of and parallel with said cross-head to retain said pin and crank-arm in one direction during the movement of said cross-head, substantially as shown and described.

12. The combination in a machine for manufacturing paper boxes from blanks, of a cross-head to carry forward said blanks, a shaft mounted in said cross-head adapted to be rotated in either direction, a pinion mounted on said shaft, a rack-toothed bar likewise mounted in said cross-head the teeth whereof are arranged to mesh with said pinion, oppositely-disposed springs on said bar to actuate the same and rotate said shaft, a crank mounted on one end of said shaft bearing a pin, a bar mounted on the frame of said machine to one side of and parallel with said cross-head, brackets and strips mounted adjacent to the end of said bar but separated therefrom to permit the raising of said pin and the partial rotation of said crank and shaft, substantially as shown and described.

13. The combination in a machine for manufacturing paper boxes from blanks consisting of a preliminary pair of scoring-rolls, a table to receive said blanks from said scoring-rolls, a cross-head reciprocating in the frame of said machine, strips provided with raised ridges adjustably mounted on said cross-head, a plurality of secondary scoring-rolls mounted above said cross-head, a pair of auxiliary longitudinal rods standing over said cross-head and between said strips, springs supported by an overhung bridge to bear upon said blanks, a pair of nippers in said cross-head to seize the said blank and carry it forward with said cross-head, a pair of folding-blades to bear upon the upper surfaces of said blanks during their motion, and a pair of hinged folders to fold the ends of said blank, means to cause said blank to advance along said auxiliary rods after the motion of said cross-head has ceased, and a series of pressing-rolls to press said blank, substantially as shown and described.

14. The combination in a machine for manufacturing paper boxes from blanks, of means to score said blanks in one direction, means to receive them after said scoring, a cross-head to carry said blanks forward, means to retain them on said cross-head, secondary scoring-rolls to score them transversely, a pair of folders to fold the ends of said blanks upon each other consisting of hinged pointed plates pivotally attached to vertical plates, vertical plates to sustain said hinged plates mounted on inwardly-projecting stub-shafts, stub-shafts to sustain said vertical plates mounted on the sides of the frame of the machine and normally held in one direction by springs, of a pair of revolving curved arms to bear upon said folders and cause them to perform their hereinbefore-described function at determinate intervals, substantially as shown and described.

15. The combination in a machine for manufacturing paper boxes from blanks, of a cross-head provided with means to seize the blank and carry it forward, transverse scoring-rolls to operate thereon, of a pair of folders to fold the ends of said blanks upon one another, a pair of curved revolving plates to operate said folders at determinate intervals, a revolving foot mounted on the shaft of said curved plates to rotate therewith, a roller mounted below said blank to force said blank forward after folding in connection with said foot, substantially as shown and described.

16. The combination in a machine for manufacturing paper boxes from blanks consisting of a cross-head provided with means for seizing the blank and carrying it forward, of a pair of folders to fold the ends of said blanks one upon another, a revolving foot adapted to bear upon the upper surface of said blank after folding, a shaft mounted below said folders, an arm mounted thereon, a roller on said arm, a spring to normally hold downward said roller, a cam-actuated roller to cause said first roller to rise and support the under side of said blank during the pressure of said revolving foot upon the upper surface thereof, and a pair of longitudinal auxiliary rods to support the sides of said blank during its passage, substantially as shown and described.

17. The combination in a machine for manufacturing paper boxes from blanks, of a cross-head to carry forward said blanks, scoring-rolls to score transversely while on said cross-head, folders to fold them, revolving plates to operate said folders, a rotating foot and a roller adapted to meet to carry forward said blanks, a pair of longitudinal rods to sustain said blanks, a pair of corrugated rollers to seize said blanks and move the same at the conclusion of the stroke of said foot, a series of similar pressing-rolls to receive and press said blanks from said corrugated rollers, substantially as shown and described.

18. In a machine for manufacturing paper boxes from blanks, of a cross-head adapted to reciprocate along the frame of the machine, means mounted on said cross-head to seize and retain said blanks, folders mounted above said cross-head to fold said blanks, revolving curved plates to operate said folders, a shaft to support said plates, a sprocket-chain and a sprocket-wheel on the shaft of said curved plates to actuate said shaft, a sprocket-wheel on the main shaft of said machine to operate said chain, with means to force forward said blanks for folding, and pressing mechanism to press said blanks, substantially as shown and described.

In testimony that I claim the above I hereunto set my hand in the presence of two subscribing witnesses.

JOHN W. DENMEAD.

In presence of—
C. P. HUMPHREY,
C. E. HUMPHREY.